(12) United States Patent
Lunev

(10) Patent No.: US 11,775,329 B1
(45) Date of Patent: Oct. 3, 2023

(54) SYSTEM AND METHOD FOR REDUCING VIRTUAL MACHINE LIVE MIGRATION DOWNTIME

(71) Applicant: Virtuozzo International GmbH, Schaffhausen (CH)

(72) Inventor: Denis Lunev, Moscow (RU)

(73) Assignee: VIRTUOZZO INTERNATIONAL GMBH, Schaffhausen (CH)

( * ) Notice: Subject to any disclaimer, the term of this patent is extended or adjusted under 35 U.S.C. 154(b) by 263 days.

(21) Appl. No.: 17/138,061

(22) Filed: Dec. 30, 2020

(51) Int. Cl.
*G06F 9/455* (2018.01)
*G06F 9/48* (2006.01)

(52) U.S. Cl.
CPC ........ *G06F 9/45558* (2013.01); *G06F 9/4812* (2013.01); *G06F 9/4856* (2013.01); *G06F 2009/4557* (2013.01); *G06F 2009/45579* (2013.01)

(58) Field of Classification Search
CPC .................................................. G06F 9/45558
USPC .......................................................... 718/1
See application file for complete search history.

(56) References Cited

U.S. PATENT DOCUMENTS

| | | | | |
|---|---|---|---|---|
| 9,715,469 B1* | 7/2017 | Arroyo | ............... | G06F 9/45558 |
| 9,733,980 B1* | 8/2017 | Khan | .................. | H04L 41/0897 |
| 2005/0228923 A1* | 10/2005 | Zimmer | ............... | G06F 9/4812 |
| | | | | 710/269 |
| 2006/0117130 A1* | 6/2006 | Tsushima | ............ | G06F 9/45558 |
| | | | | 711/6 |
| 2011/0302577 A1* | 12/2011 | Reuther | .............. | G06F 9/45558 |
| | | | | 718/1 |
| 2012/0042034 A1* | 2/2012 | Goggin | ................. | G06F 3/0647 |
| | | | | 709/216 |
| 2012/0254866 A1* | 10/2012 | Iwamatsu | ............... | G06F 3/061 |
| | | | | 718/1 |
| 2013/0227559 A1* | 8/2013 | Tsirkin | ................ | G06F 9/45558 |
| | | | | 718/1 |
| 2013/0326177 A1* | 12/2013 | Oiwa | ..................... | G06F 3/0647 |
| | | | | 711/162 |
| 2014/0059292 A1* | 2/2014 | Phelan | .................. | G06F 3/0631 |
| | | | | 711/113 |
| 2014/0115228 A1* | 4/2014 | Zhou | .................... | G06F 12/0246 |
| | | | | 711/102 |
| 2014/0149985 A1* | 5/2014 | Takeuchi | .............. | G06F 9/4555 |
| | | | | 718/1 |

(Continued)

*Primary Examiner* — Mehran Kamran
(74) *Attorney, Agent, or Firm* — ArentFox Schiff LLP; Michael Fainberg

(57) ABSTRACT

Disclosed herein are systems and method for live migration of a guest OS, the method comprising: interrupting execution of the guest OS in the hypervisor on a source computing device, transferring a state of the guest OS from the hypervisor on the source computing device to a hypervisor on a target computing device, and resuming execution of the guest OS in the hypervisor on the target computing device without waiting for completion of pending I/O requests on the source, wherein the pending I/O requests are generated by the guest OS in the hypervisor on the source and have not been completed before the interruption of execution of the guest OS, and wherein after resuming execution of the guest OS, the guest OS in the hypervisor on the target computing device is allowed to generate new I/O requests without waiting for completion of pending I/O requests on the source computing device.

22 Claims, 11 Drawing Sheets

(56) References Cited

U.S. PATENT DOCUMENTS

| | | | |
|---|---|---|---|
| 2015/0378783 A1* | 12/2015 | Tarasuk-Levin | G06F 12/08 |
| | | | 718/1 |
| 2018/0113644 A1* | 4/2018 | Arroyo | G06F 3/0647 |
| 2018/0246756 A1* | 8/2018 | Abali | G06F 9/544 |
| 2018/0268019 A1* | 9/2018 | Rostagni | G06F 16/2365 |
| 2018/0357092 A1* | 12/2018 | Kaul | G06F 9/45558 |
| 2019/0116132 A1* | 4/2019 | Suzuki | G06F 9/542 |
| 2019/0361728 A1* | 11/2019 | Kumar | H04L 67/34 |
| 2020/0167176 A1* | 5/2020 | Arroyo | G06F 9/45558 |
| 2020/0241907 A1* | 7/2020 | Dornemann | G06F 11/2094 |
| 2020/0356493 A1* | 11/2020 | Mukherjee | G06F 12/1009 |
| 2021/0019230 A1* | 1/2021 | Chandra | G06F 11/1451 |
| 2021/0271512 A1* | 9/2021 | Hay | G06F 9/4812 |
| 2021/0357342 A1* | 11/2021 | Schimke | G06F 11/0745 |
| 2022/0188042 A1* | 6/2022 | Tatiparthi | G06F 3/067 |
| 2022/0263897 A1* | 8/2022 | Karr | G06F 11/2071 |

* cited by examiner

SYSTEM AND METHOD FOR REDUCING VIRTUAL MACHINE LIVE MIGRATION DOWNTIME

TECHNICAL FIELD

The present disclosure is generally related to the field of reducing downtime during live migration of virtual machines from one server to another server.

BACKGROUND

Live migration of VMs (virtual machines) refers to an act of moving a running virtual machine (i.e., currently executing) from a source server (e.g., a physical server on which the VM is currently running) to a target server (e.g., a physical server on which the VM will be running after the migration is completed).

The live migration typically requires multiple steps to be performed by the hypervisors of the source and the target servers. During live migration, for each VM being migrated, the hypervisor of the source server stops the VM on the source server and sends states of the stopped VM (memory state, virtual disk state, and other device states of the VM) from the source server to the target server. Then, the hypervisor of the target server starts/proceeds the execution of the VM on the target server.

The time between stopping the execution of the guest OS in VM on the source server and starting it back on the target server is referred to as "downtime". The downtime is composed of: a time for completion of I/O requests, a time for transferring device states, a time for transferring dirty memory, and a time for starting execution of the guest OS on the target server.

During the time for completion of I/O requests, all uncompleted requests to disk are completed and synchronization (e.g., a sync request) is performed. Generally, when the guest OS execution is stopped on the source server, there are some uncompleted I/O requests on the source server. Due to high number of I/O requests in the system and high storage latency, this time is up to seconds and cannot be predicted in advance (i.e., unpredictable). The time for transferring the device states is on the order of 10-100 milliseconds. The state of devices may be about 1 MB of data. For example, transferring the device state includes transferring the states of the Network Interface Controller (NIC), disk controller, Advanced Programmable Interrupt Controller (APIC), etc. The time for transferring dirty memory is also up to seconds, but can be predicted in advance, and the length of this step can be controlled. The time for starting execution of the guest OS on the target server is on the order of microseconds.

For the time it takes to send the virtual disk state, it is notable that the virtual disk size usually does not affect the live migration downtime. This is because virtual disk is usually stored on a network storage. As such, during migration, it is enough to update links to storage.

For the time it takes to send the memory state, most parts of the VM memory can be transferred while the VM is running (e.g., before or after downtime). In addition, there are several ways to work with dirty memory. For example, one may move all dirty memory from source to target during downtime. Or, for example, one may first, start the VM on target, and then, if the VM on target requires a missed page, transfer the missed page from source to target, for example, via a Remote Procedure Call (RPC) protocol.

Thus, when compared to transferring the virtual disk state, memory state, the device states, and starting the guest OS on the target server, the wait time for completion of I/O request is too long. Moreover, since the number of I/O requests varies, the wait time is unpredictable. Canceling the requests on the source server is generally not a viable option. As such, the time needed for completion of I/O requests significantly increases the downtime (and decreases predictability) for live migration of the VM from one server to another server.

Therefore, the existing approaches have shortcomings in regards to the amount of time needed for performing VM live migrations. Therefore, there is a need for improving VM live migrations.

SUMMARY

The present disclosure describes a method and a system for performing a live VM migration from a source server to a target server without waiting for completion of uncompleted I/O requests. For example, in one aspect, a method is provided for performing a live VM migration from one physical server (the source server) to another physical server (the target server).

In one aspect, the method for a live migration of a guest OS comprises: interrupting execution of the guest OS in a hypervisor on a source computing device; transferring a state of the guest OS from the hypervisor on the source computing device to a hypervisor on a target computing device; and resuming execution of the guest OS in the hypervisor on the target computing device without waiting for completion of pending I/O requests on the source computing device, wherein the pending I/O requests are the I/O requests that have been generated by the guest OS in the hypervisor on the source computing device and have not been completed before the interruption of execution of the guest OS, and wherein after resuming execution of the guest OS in the hypervisor on the target computing device, the guest OS in the hypervisor on the target computing device is allowed to generate new I/O requests without waiting for completion of the pending I/O requests on the source computing device.

In one aspect, the pending I/O requests are I/O requests to a virtual disk of the guest OS, and the virtual disk of the guest OS is stored on a storage accessible by both the source computing device and the target computing device.

In one aspect, the method further comprises: creating, by the hypervisor on the target computing device, one or more fake I/O requests corresponding to one or more of the pending I/O requests.

In one aspect, the method further comprises: by the hypervisor on the target computing device, for each of the pending I/O requests, restarting on the target computing device the pending I/O request when the pending I/O request is a read request; and creating a fake I/O request corresponding to the pending I/O request when the pending I/O request is an I/O request that modifies a virtual disk of the guest OS.

In one aspect, each of the one or more fake I/O requests waits for completion of corresponding pending I/O request on the source computing device.

In one aspect, the method further comprises: for each of the one or more of the pending I/O requests, sending, by the source computing device, a notification about completion of the pending I/O request on the source computing device; and completing, by the hypervisor on the target computing device, a fake I/O request corresponding to the pending I/O request upon receiving the notification.

In one aspect, the one or more of the pending I/O requests are I/O requests that modify a virtual disk of the guest OS.

In one aspect, the hypervisor on the target computing device postpones at least one of the new I/O requests on the target computing device that is for an area overlapping with an area of at least of the fake I/O requests corresponding to at least one of the pending I/O requests until completion of the at least one of the pending I/O requests on the source computing device.

In one aspect, the fake I/O requests are expanded fake I/O requests, wherein areas of the expanded fake I/O requests are expanded and aligned on a size of storage chunks.

In one aspect, the hypervisor on the target computing device postpones at least one I/O request on the target computing device that is for an area overlapping with an area of at least one of the expanded fake I/O requests until completion of at least one of the pending I/O requests corresponding to the at least one of the expanded fake I/O requests.

In one aspect, the hypervisor on the target computing device postpones at least one I/O request on the target computing device that is for access to a same storage chunk as at least one of the pending I/O requests on the source computing device until completion at least one of the pending I/O requests on the source computing device.

In one aspect, the state of the guest OS includes information about at least one of the pending I/O requests.

In one aspect, the transferring a state of the guest OS further comprises: creating a queue of the pending I/O requests; and adding the queue into a device state in the state of the guest OS.

In one aspect, the storage guarantees consistency of results of simultaneous operations, wherein the simultaneous operations comprise the source server and the target server reading and writing simultaneously to non-overlapping areas in a chunk of the storage; and the method further comprises: by the hypervisor on the target computing device, first, for each read request of the pending I/O requests, restarting the read; and then, for each write request of the pending I/O requests, creating, a corresponding fake write request, and, for each fake write request that is created, marking the fake write request as completed when a notification is received from the hypervisor on the source computing device indicating that the corresponding write request on the source computing device is completed.

In one aspect, the storage does not guarantee consistency of results of simultaneous operations, wherein the simultaneous operations comprise the source server and the target server reading and writing simultaneously to non-overlapping areas in a chunk of the storage; and the method further comprises, by the hypervisor of the target computer device, for each of write request of the pending I/O requests, creating an expanded fake write request, wherein the expanded fake write requests are indicated as being completed only upon completion of corresponding write requests on the source device; for each expanded fake write request, blocking all requests on the target computing device that are for all chunks that store a same storage area of the expanded fake write request until the request is indicated as being completed; and for each expanded fake write request marked as completed, unblocking all requests that have been blocked to wait until the expanded fake write request is completed.

In one aspect, a system is provided for performing a live VM migration from a source server (a first physical server) to a target server (a second physical server), the system comprising any number of physical servers having respective processors and memory, a storage area network that comprises a network or shared storage resources, a network management module for managing the physical servers and virtual machines, a live migration module for migrating virtual machines from one physical server to another physical server, the live migration module configured to: interrupt execution of the guest OS in a hypervisor on a source computing device; transfer a state of the guest OS from the hypervisor on the source computing device to a hypervisor on a target computing device; and resume execution of the guest OS in the hypervisor on the target computing device without waiting for completion of pending I/O requests on the source computing device, wherein the pending I/O requests are the I/O requests that have been generated by the guest OS in the hypervisor on the source computing device and have not been completed before the interruption of execution of the guest OS, and wherein after resuming execution of the guest OS in the hypervisor on the target computing device, the guest OS in the hypervisor on the target computing device is allowed to generate new I/O requests without waiting for completion of the pending I/O requests on the source computing device.

In one aspect, the present disclosure describes a non-transitory computer readable medium storing thereon computer executable instructions for performing a live VM migration from a source server to a target server, including instructions for: interrupting execution of the guest OS in a hypervisor on a source computing device; transferring a state of the guest OS from the hypervisor on the source computing device to a hypervisor on a target computing device; and resuming execution of the guest OS in the hypervisor on the target computing device without waiting for completion of pending I/O requests on the source computing device, wherein the pending I/O requests are the I/O requests that have been generated by the guest OS in the hypervisor on the source computing device and have not been completed before the interruption of execution of the guest OS, and wherein after resuming execution of the guest OS in the hypervisor on the target computing device, the guest OS in the hypervisor on the target computing device is allowed to generate new I/O requests without waiting for completion of the pending I/O requests on the source computing device.

The above summary of example aspects serves to provide an understanding of the teachings of the present disclosure. This summary is not an extensive overview of all contemplated aspects, and is intended to neither identify key or critical elements of all aspects nor delineate the scope of any or all aspects of the disclosure. Its sole purpose is to present one or more aspects in a concise form as a prelude to the more detailed description of the disclosure that follows. To the accomplishment of the foregoing, the one or more aspects of the methods and systems of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the teachings of the present disclosure and, together with the detailed description, serve to explain their principles and implementations.

DETAILED DESCRIPTION

Figure 1:
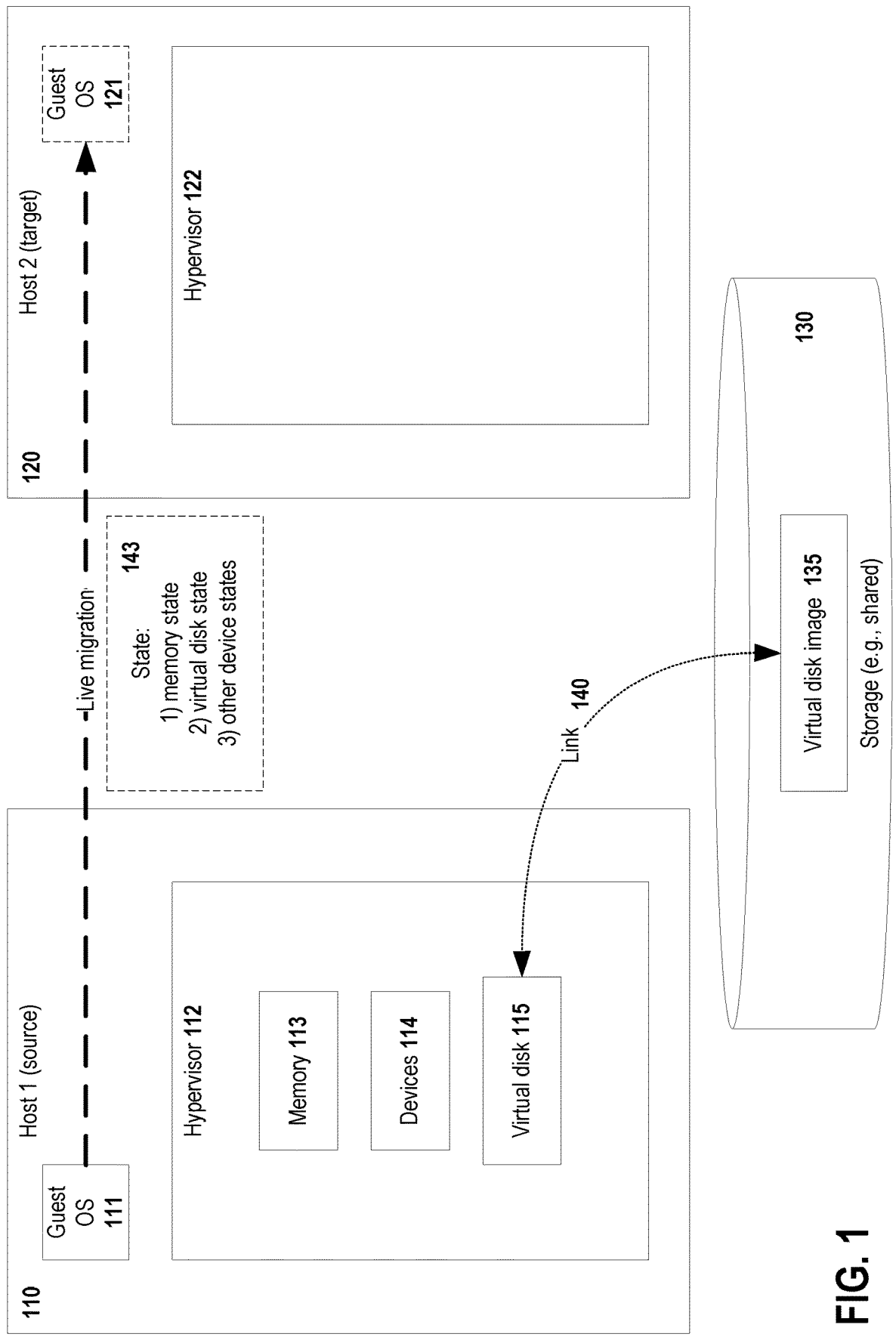
FIG. 1 is a block diagram illustrating a system for live migration of a VM.

Various exemplary aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a description of one or more exemplary aspects in order to provide a basic understanding of the disclosed system and method. This description is not an extensive overview of all contemplated aspects, and is not intended to identify key or critical elements of all aspects nor delineate the scope of any or all aspects.

FIG. 1 is a block diagram illustrating a system 100 for live migration of a VM. The system 100 comprises a source server 110, a target server 120 and a shared storage 130. The shared storage 130 comprises virtual disk image 135 (containing VM disk data; e.g., virtual disk image may be a file, a block device on the storage). The shared storage 130 may be a network storage, a distributed storage, may be a server connected to both the source server and the target server, a disk on a source server with access from the target server (or vice versa), etc. The source server 110, the target server 120 and the shared storage disk 130 are connected via network and communicate to each other. In one aspect, the source 110 and the target 120 may be either a physical device or a virtual machine. The source server 110 and the target server 120 may be any kind of physical device, and even a virtual machine in case of nested virtualization.

The source server 110 has a guest OS 111 running on a hypervisor 112. The hypervisor 112 manages VM memory 113, VM devices 114, VM virtual disk 115 (which is connected to virtual disk image 135 on storage via link 140; in one aspect, virtual disk 115 is a representation for the guest OS of the data laying in the virtual disk image 135 on storage; so, in some aspects, both virtual disk 115 and virtual disk image 135 are called "virtual disk"s) for the guest OS 111. The virtual disk 115 receives I/O requests from the guest OS and processes them by performing corresponding I/O operations over the virtual disk image 135 on the shared storage. Similarly, after migration the target server 120 will have a guest OS 121 (the migrated version of the guest OS 111) in a hypervisor 122. The guest OS 111 and the guest OS 121 are different designations of the same guest OS and are used only to show where exactly the guest OS is executing at each moment. A live migration of the VM (e.g., the guest OS) from the source server 110 to the target server 120 (the migrated guest OS is shown as 121) requires multiple steps to be performed by the hypervisors of the source and target servers.

For example, during live migration of the guest OS 111, the hypervisor 112 of the source server 110 stops execution of the VM CPUs on the source server 110 and sends state 143 of the VM to the hypervisor 122 on the target server. The state includes, for example, at least one of: a dirty memory state, a virtual disk state, and other device states (e.g., CPU, Network Interface Controller (NIC), disk controller, Advanced Programmable Interrupt Controller (APIC), etc.) of the VM.

Figure 2:
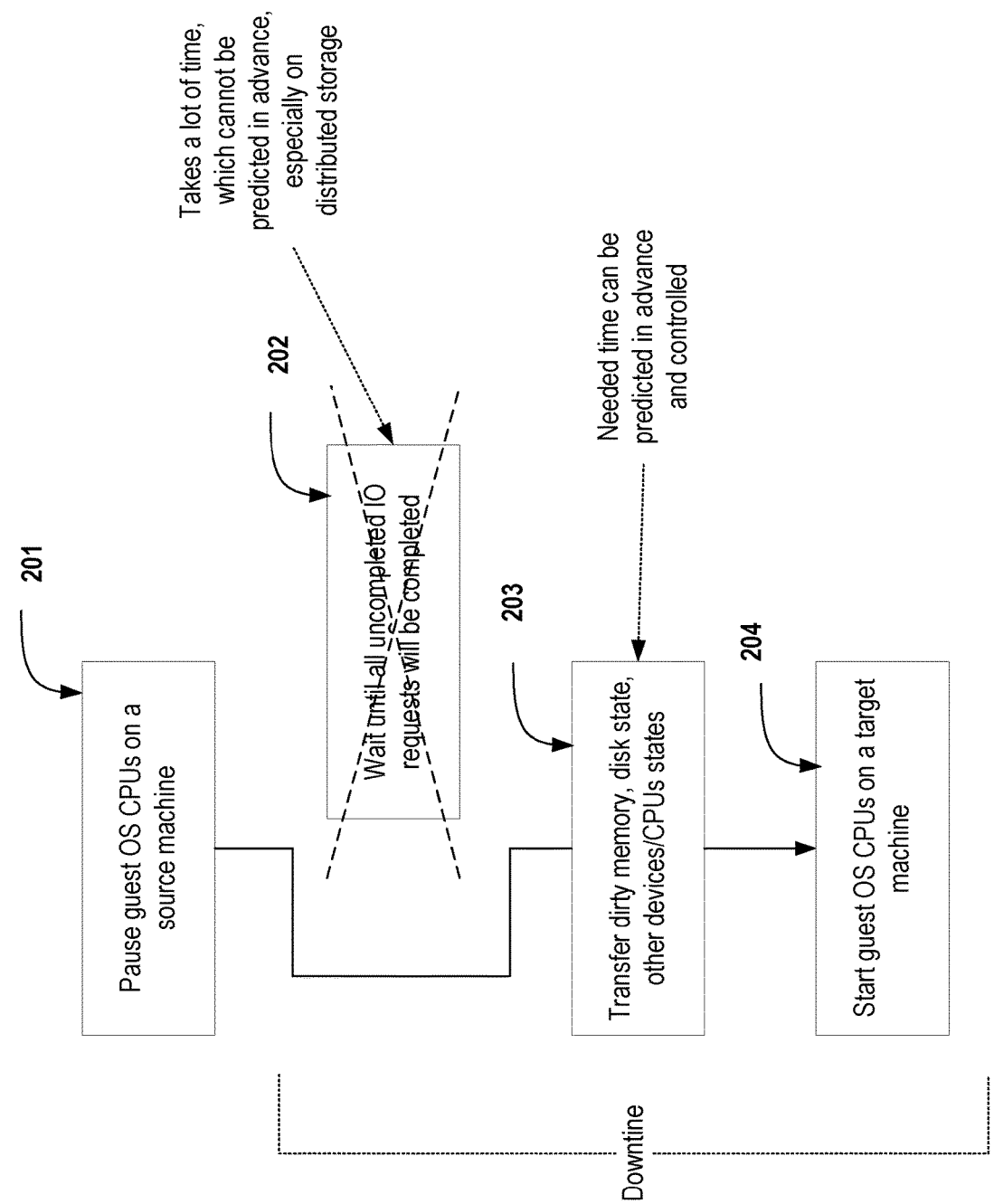
FIG. 2 is a block diagram illustrating a timeline associated with a live migration downtime according to an exemplary aspect.

FIG. 2 is a block diagram illustrating a timeline associated with a live migration downtime according to an exemplary aspect. In one exemplary aspect, during live migration the hypervisor 122 on the target system 120 is allowed to run (i.e., resume execution of) the guest OS (which in turn is allowed to generate new I/O requests) without waiting for pending I/O requests completion at the source system 110. For example, FIG. 2 shows the steps performed in one aspect during live migration, which influence on a length of downtime (i.e., the time during which the VM CPUs are stopped and the guest OS does not work). As shown on the FIG. 2, the live migration in this case includes pausing guest OS 111 CPUs (i.e., pause (i.e., interrupt) execution of the guest OS) on the source machine 110, as shown at step 201. Then, at step 203 transferring state of the guest OS from the source 110 to the target 120. The state may include, for example, dirty memory (in some cases most parts of the memory state is transferred before or after downtime), disk state, other devices states, CPUs states, etc. For example, guest's CPU may be a virtual CPU, and the devices may be virtual devices. Then, at step 204 (before this step a VM already exists, but the guest OS inside of it is not yet running) the hypervisor 122 starts guest OS CPUs (i.e., resume execution of the guest OS on the target machine 120. The step 202 is not performed. In the aspect, the hypervisor 122 resumes execution of the guest OS (which now is denoted as 121) without waiting for uncompleted I/O requests. Uncompleted I/O requests are those that have been generated by the guest OS 111, but have not been completed before stopping guest OS CPUs. Due to high number of I/O requests and high storage latency, waiting until all uncompleted I/O requests will be completed may take a lot of time (up to seconds), which cannot be predicted in advance, especially on distributed storage. Therefore, in the exemplary aspect, comparing to existing solutions, the live migration downtime is reduced, on average, by a factor of at least 10.

In one aspect, during live migration of the guest OS the following steps are performed: interrupting execution of the guest OS (while the guest OS is on the source 110, it is denoted as 111) in the hypervisor 112 on the source computing device 110; transferring a state 145 of the guest OS from the hypervisor 112 on the source computing device 110 to a hypervisor 122 on the target computing device 120; resuming execution of the guest OS (while the guest OS is on the target 120, it is denoted as 121) in the hypervisor 122 on the target computing device 120 without waiting for completion of pending I/O requests 350 on the source computing device 110. The pending I/O requests 350 are the I/O requests to the virtual disk 115 that have been generated by the guest OS 111 in the hypervisor 112 on the source computing device 110 and have not been completed before the interruption of execution of the guest OS 111. After resuming execution of the guest OS 121 in the hypervisor 122 on the target computing device 120, the guest OS 121 in the hypervisor 122 on the target computing device 120 is allowed to generate new I/O requests 351, without waiting for completion of the pending I/O requests on the source computing device 110.

Figure 3:
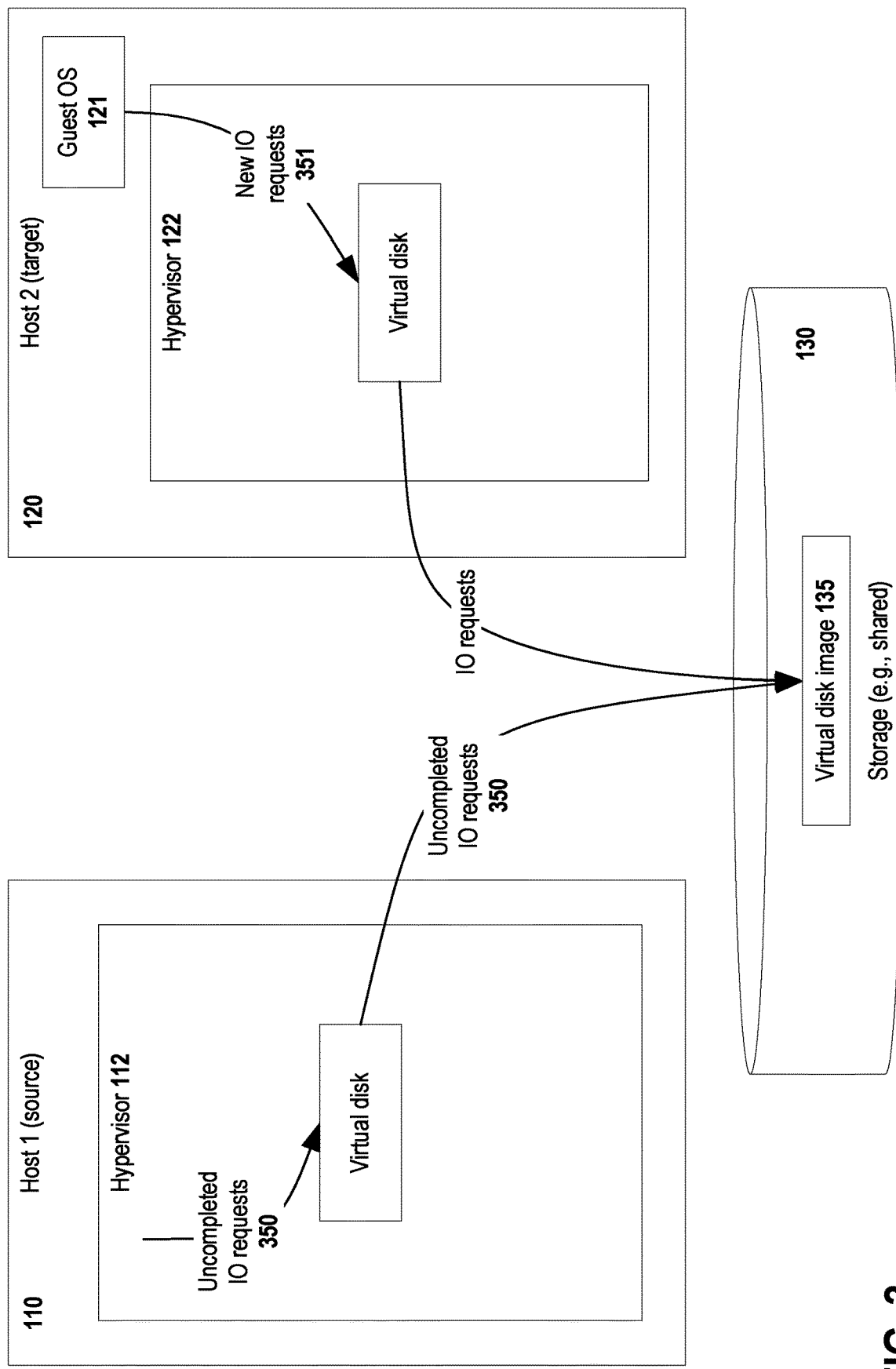
FIG. 3 is a block diagram illustrating a system with live migration with reduced downtime according to an exemplary aspect.

FIG. 3 is a block diagram illustrating a system 300 with live migration with reduced downtime according to an exemplary aspect. The system 300 starts the guest OS 121 on the target server 120 without waiting for completion of uncompleted (i.e., pending) I/O requests 350 on the source server 110. In one aspect, while uncompleted I/O requests 350 are being processed by the source computing device 110, the guest OS 121 is running in the hypervisor 122 on the target server 120 and may generate new I/O requests 351 (e.g., to the VM virtual disk). The new I/O requests 351 are processed by the target server 120. Processing of an I/O request may involve asynchronous IO operation over the shared storage 130, which means that the operation is started and completed afterwards.

Figure 4:
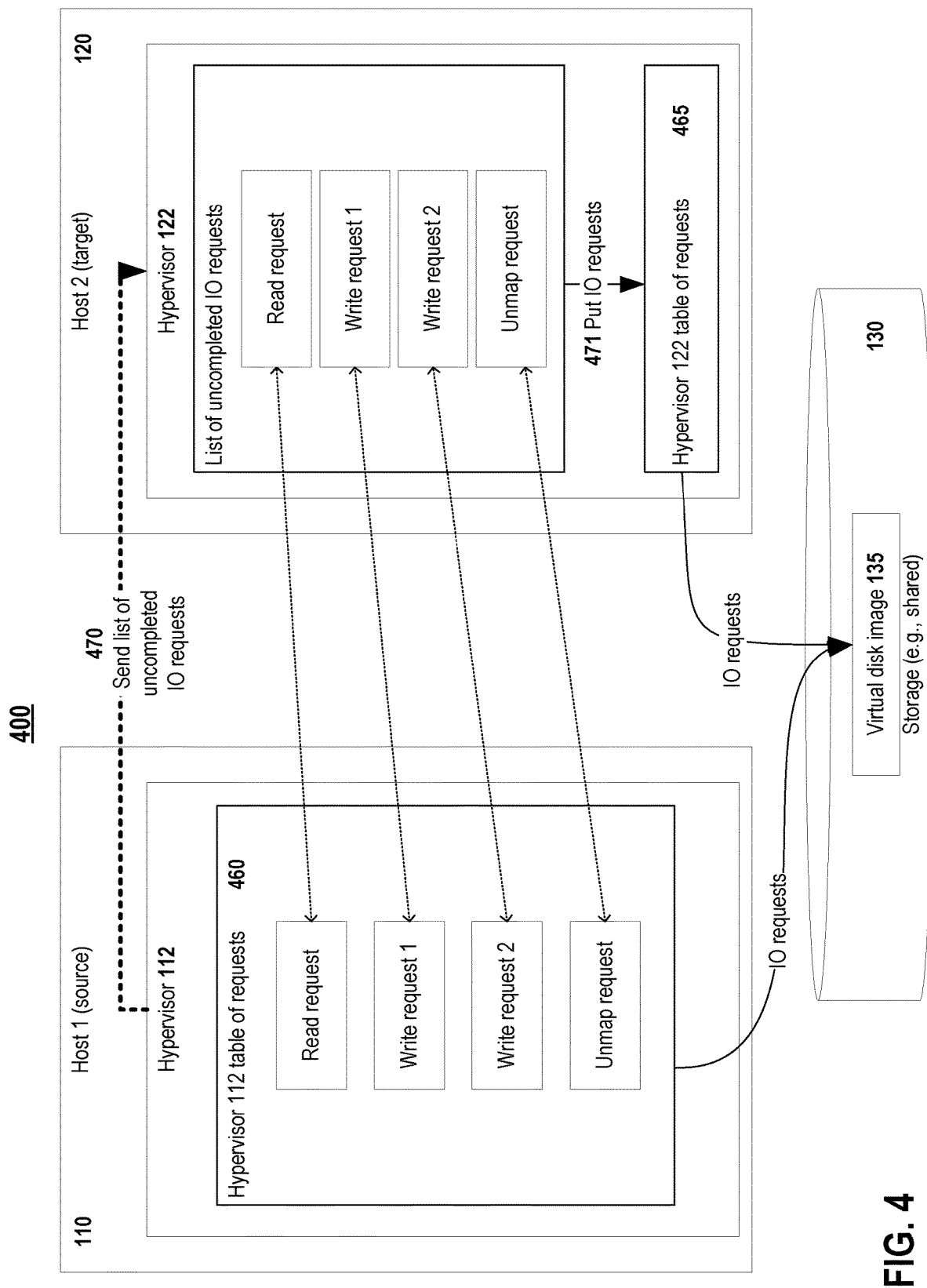
FIG. 4 is a block diagram illustrating transferring information about of requests in accordance with an exemplary aspect.

FIG. 4 is a block diagram 400 illustrating transferring information about requests in accordance with an exemplary aspect. In one aspect, the hypervisor 112 of the source server 110 maintains a table (or a queue of pending requests, etc., in some aspects) of requests 460 and the hypervisor 122 of the target server 120 maintains a table (or a queue of pending requests, etc., in some aspects) of requests 465. For example, the table of requests 460 may include any number requests of any kind.

I/O requests may be, for example, read requests, write requests, sync requests (synchronization), discard requests, un-map requests, trim requests (trimming), etc.

In one aspect, when execution of the guest OS 111 on the source is interrupted, the table of requests 460 contains all uncompleted I/O requests 350. In one aspect, while the guest OS is working and generating I/O requests, the requests are added to the table of requests in the hypervisor. When an I/O requests is completed it may be deleted from the table. The table contains all pending requests.

When the VM is being live migrated, the information about uncompleted I/O requests (e.g., a list, a queue, etc.) is transferred to the hypervisor 122 of the target server 120, as shown in 470. In one aspect, the information about uncompleted I/O requests is transferred as a part of VM devices state.

The hypervisor 122 receives the information about uncompleted I/O requests 350 from the hypervisor 112 and amends (e.g., fills, creates, etc.) the table of requests 465 maintained by the hypervisor 122 based on the received information, as shown in 471. In some aspects, the hypervisor 122 for each of the I/O requests mentioned in the received information (e.g., in the list of the uncompleted requests) creates a new request in the table of requests 465. In different aspects, the new request may be of the same or different type (e.g., read, write, sync, discard/unmap/trim, etc.) and for the same or different data area (e.g., range of addresses in virtual disk, or in storage, etc.) as the original uncompleted I/O request on the source. In one aspect, the hypervisor 122 adds at least some of mentioned the I/O requests to the table of requests 465.

Figure 5:
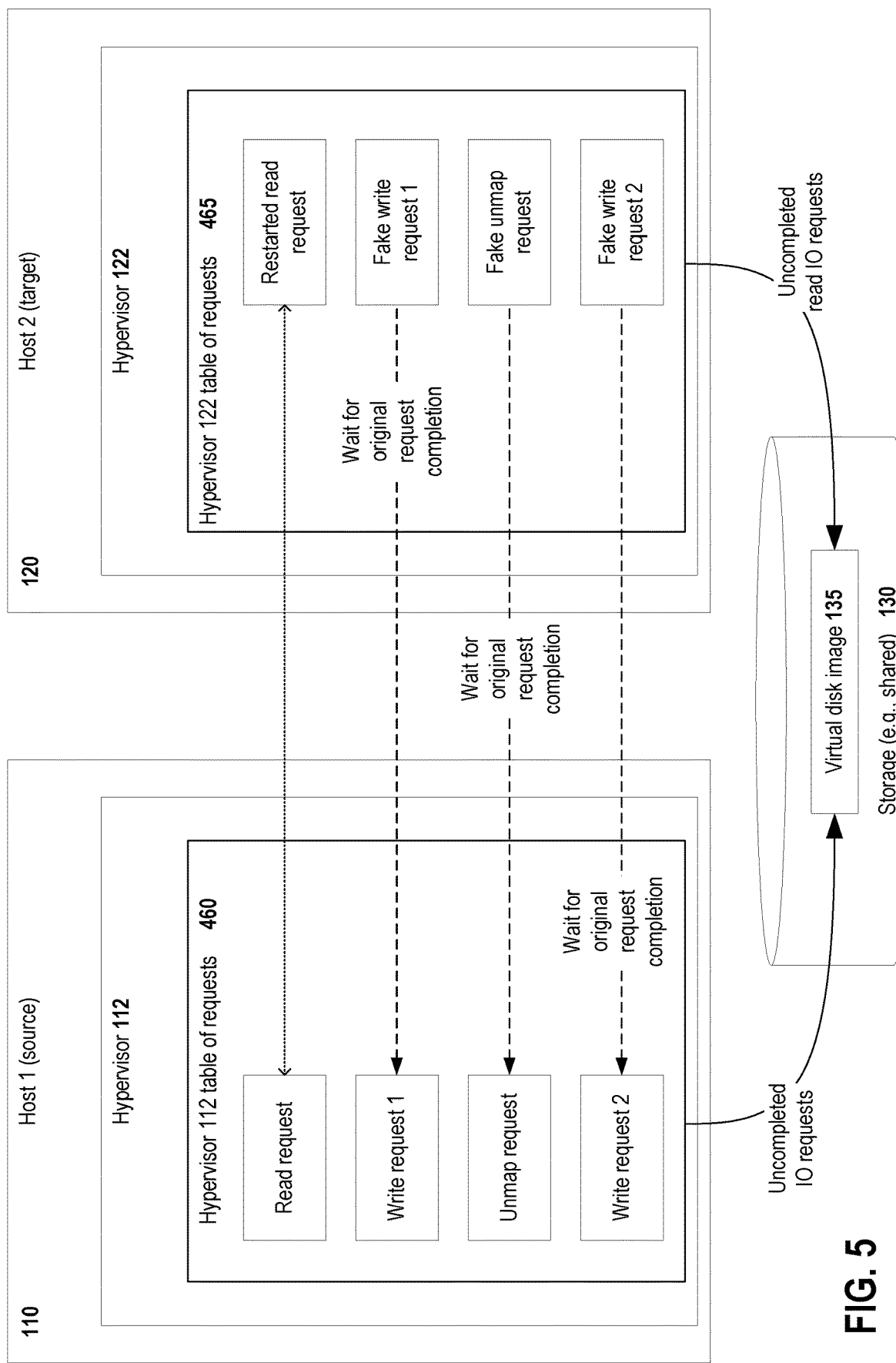
FIG. 5 is an exemplary block diagram illustrating creation of fake I/O requests according with an exemplary aspect.

FIG. 5 is an exemplary block diagram illustrating creation of fake I/O requests according with an exemplary aspect. In one aspect, the hypervisor 122 on target for at least some of the I/O requests mentioned in the received information (e.g., in the list of the uncompleted requests) puts fake requests into the table of requests 465 (e.g., into a table/list/queue, etc. of pending I/O requests to virtual disk for the guest OS maintained by the hypervisor 122).

In one aspect, for each of requests that modify the disk state—for example, write, sync, unmap, discard, trim, etc. requests—the hypervisor 122 creates a fake request of the sane type in the table 465. The size of the area of such request may be the same as it was in the original request or may be expanded. In one aspect, the hypervisor 122 creates such new fake requests.

In one aspect, for each of requests that do not modify the disk state—for example, read requests—the hypervisor 122 creates the same request in the table 465. In one aspect, the hypervisor 122 restarts all such requests on the target 120. In another aspect, fake read requests are created.

The fake requests on the target will wait for original request completion. E.g., the hypervisor 122 on target will mark them as completed upon receiving, from the hypervisor 112 on the source, a notification (and, in some cases, a result) about completion of the corresponding uncompleted I/O request on the source 110. In one aspect, the fake write requests do not modify the disk. In one aspect, the fake requests do not contain data. In one aspect, fake requests are "virtual" requests.

In one aspect, a create fake request is a request for a same or a wider area (comparing to an area that a corresponding uncompleted I/O request on the source has), has no data, blocks other requests to the area of a fake request and waits for completion of the corresponding uncompleted I/O request on the source.

In the aspect, shown on FIG. 5, an uncompleted read request that have not been finished by the source 110 before interrupting execution of the VM, is restarted on the target 120 by hypervisor 122. Both read requests (on source and on target) will be completed independently, in parallel. Another example, is an uncompleted write request 1, that have not been finished by the source 110 before interrupting execution of the VM. The hypervisor 122 creates a corresponding fake write request 1.

Figure 6:
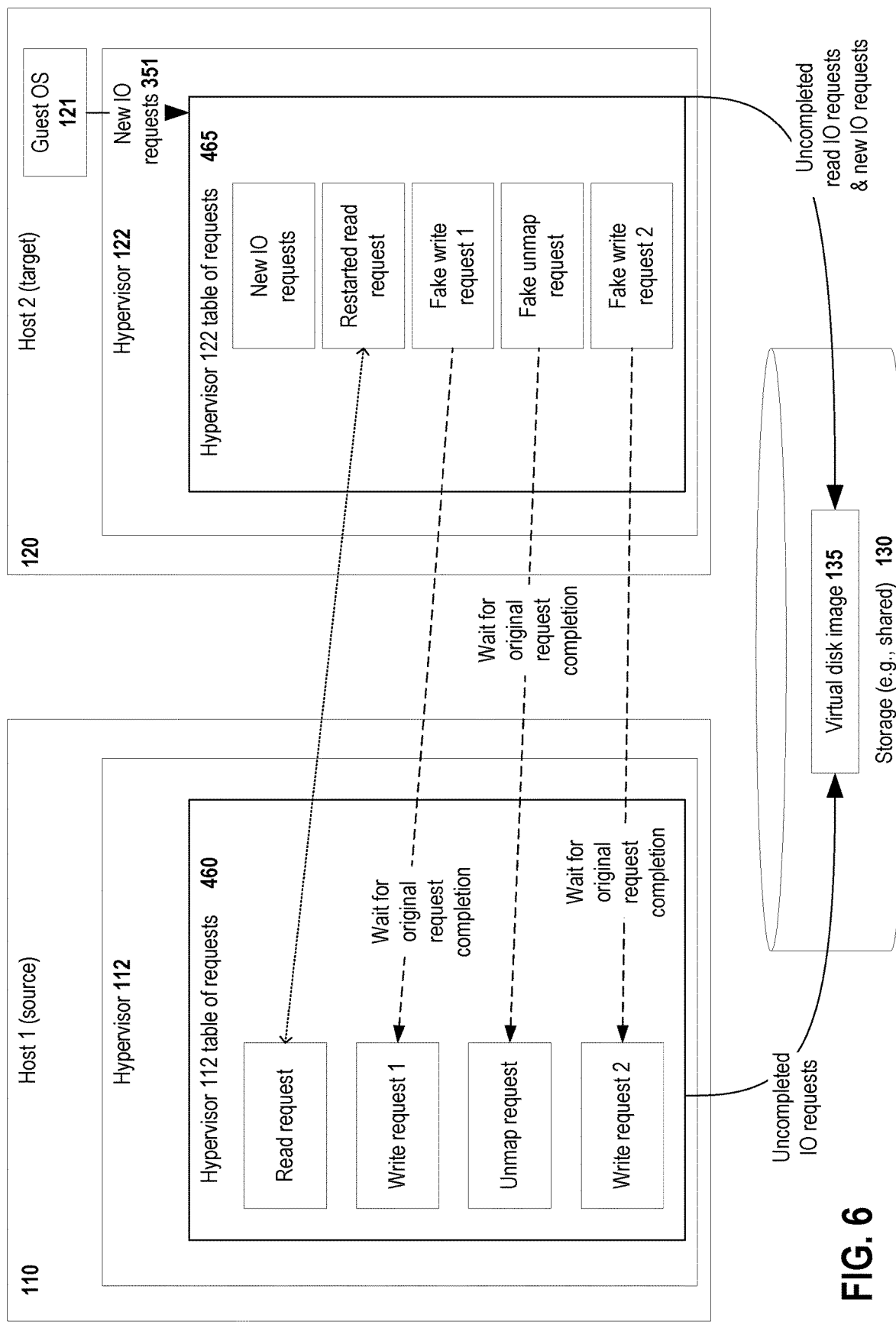
FIG. 6 is an exemplary block diagram illustrating creation of new I/O requests according with an exemplary aspect.

FIG. 6 is an exemplary block diagram illustrating creation of new I/O requests according with an exemplary aspect. When the table of pending requests (e.g., table 465) is filled, the hypervisor 122 starts execution of the guest OS 121. The guest OS 121 may then generate new I/O requests 351 to virtual disk. The new requests will be added to the table of pending requests.

In the aspect, shown on FIG. 6, the restated read requests and the new I/O requests 351 are processed by the target 120 and, at the same time, the uncompleted requests 350 are processed by the source 110.

In one aspect, while the hypervisor 122 on the target creates a queue of pending requests and starts guest OS, the hypervisor 112 on the source processes the requests and sends notifications about their completion (and, e.g., their results) to the target.

In one aspect, the live migration of a VM from the source server 110 to the target server 120 includes: by a hypervisor of the source server, interrupting an execution of the VM on the source server; collecting and sending information about uncompleted requests to the hypervisor 122 on target (e.g., by creating a list (or a queue, etc.) on the source server and storing uncompleted I/O requests of the VM in the list/queue; adding the list/queue into a device state of the VM; transferring, to a hypervisor 122 of the target server, the device state of the VM with the list/queue thereon); and sending, to the hypervisor of the target server, notifications with status or with results of the at least some (e.g., write requests, or those requests that modify disk state, or all, etc.) uncompleted I/O requests on the source when the requests are completed (e.g., when data is written to disk in case of write requests).

In one aspect, the notification sent by the hypervisor of the source server to the hypervisor of the target server includes an indication for modification of a virtual disk state of the VM when a notification is for a write request, and the notification includes data that was read when a notification if for a read request.

In one aspect, the live migration of the VM from the source server to the target server includes: by a hypervisor of the target server, information about uncompleted I/O requests (e.g., receiving the device state of the VM with a list (or a queue, or etc.) of uncompleted I/O requests saved thereon); creating, for each write (or sync, unmap, discard, trim, any request changing disk state, etc.) request mentioned in the information (e.g., in the list/queue of uncompleted I/O requests), a corresponding fake write (or sync, unmap, discard, trim, any request changing disk state, etc.) request that will wait for completion, on the source server, of the corresponding write (or sync, unmap, discard, trim, any request changing disk state, etc.) request; restarting (on the target) read requests mentioned in the information (e.g., in the list/queue of uncompleted I/O requests) to allow the guest OS on the target server to receive needed data; and for each write (or sync, unmap, discard, trim, any request changing disk state, etc.) I/O request mentioned in the information (e.g., in the list/queue), when the I/O request is completed, receiving a notification with a status or a result of the I/O request and marking the corresponding fake write (or sync, unmap, discard, trim, any request changing disk state, etc.) request as completed.

In one aspect, the virtual disk image 135 is stored on a network storage or a shared storage (e.g., shared storage 130), and the shared storage is accessible by both the source and target servers. For example, in this case data of the VM virtual disk (e.g., virtual disk's state) may be stored on the storage, and not in the VM process. E.g., virtual disk can be, for example, a RAW file.

The portions of the storage are referred to as chunks and the portions of the virtual disk are referred to as areas.

Modern hypervisors do not allow multiple simultaneous requests for the same block (and therefore, for overlapping areas in the virtual disk). E.g., a write request blocks/postpones other requests to the same area. Each completed request will unblock (e.g., wake up) all requests that have been blocked/postponed by the request. In regards to multiple simultaneous requests for the same chunk, some storage solutions allow reading and writing by multiple servers into different areas (not overlapping) of the chunk and guarantee consistency of the result of such operations. For example, in some storages, when the read and write requests are for different areas of the chunk, the storage may allow reading by one server from a chunk being modified by another server.

In one aspect, processing fake requests and order of the requests in the hypervisor table on the target depend on level of consistency provided by the storage, e.g., on the size of storage area for which consistency of results is guaranteed (e.g., the storage may provide consistency on the chunk level—simultaneous writes by different servers to different chunks are consistent, but simultaneous writes by different servers to the same chunk may be unpredictable). In one aspect, processing fake requests and order of the requests in the hypervisor table on the target depend on whether or not a result of an operation in a chuck being modified by another server does not change storage consistency.

In one aspect, the storage guarantees consistency of results of I/O requests for the same chunk sent to the storage by the source and the target simultaneously. For example, the storage may guarantee consistency of results of an I/O operation performed by the target on an area in a chunk, while the source is modifying another area of the same chunk, if the areas are not overlapping to each other. More particularly, reading by the target from a chunk being modified by the source shall always provide consistent results. In this case, the order of requests is not important, and the target server may restart all the read requests mentioned in the received information first (e.g., before handling the write requests). Thus, even if initially there is a write request between two read requests, the read requests will be for other areas of the virtual disk and will be completed correctly. Restarting the read requests before creating fake write requests (and fake requests corresponding to other types of uncompleted operations, that modify the disk state) reduces the time for finishing the migration of the VM. I.e., the target server does not need to wait for completion of original requests, corresponding to the fake requests, on the source server prior to finishing the execution of the read requests. Moreover, in this aspect, the areas of the fake requests may be the same as the areas in the corresponding original uncompleted requests.

Figure 8:
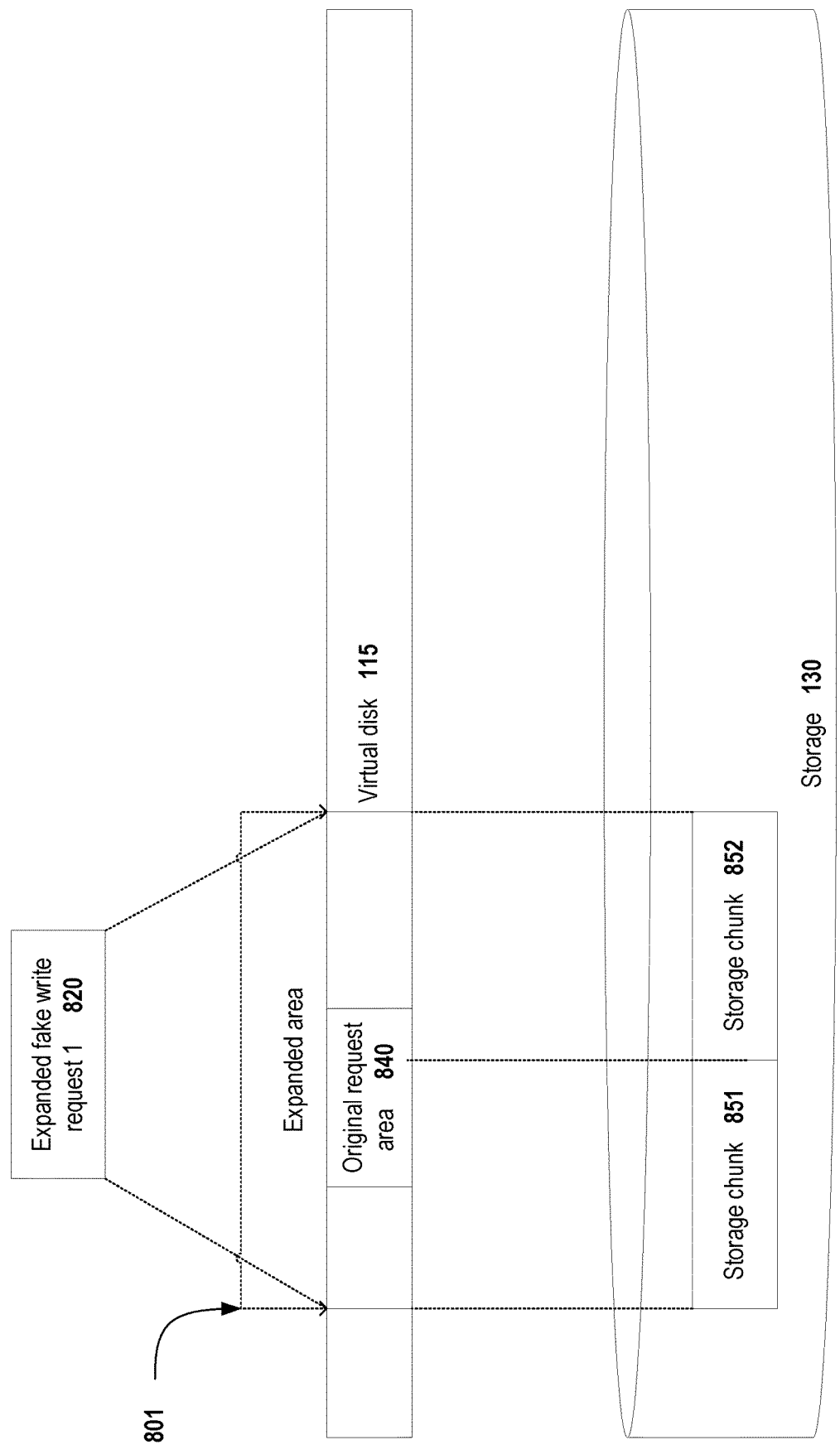
FIG. 8 illustrates an exemplary request expansion.
Figure 9:
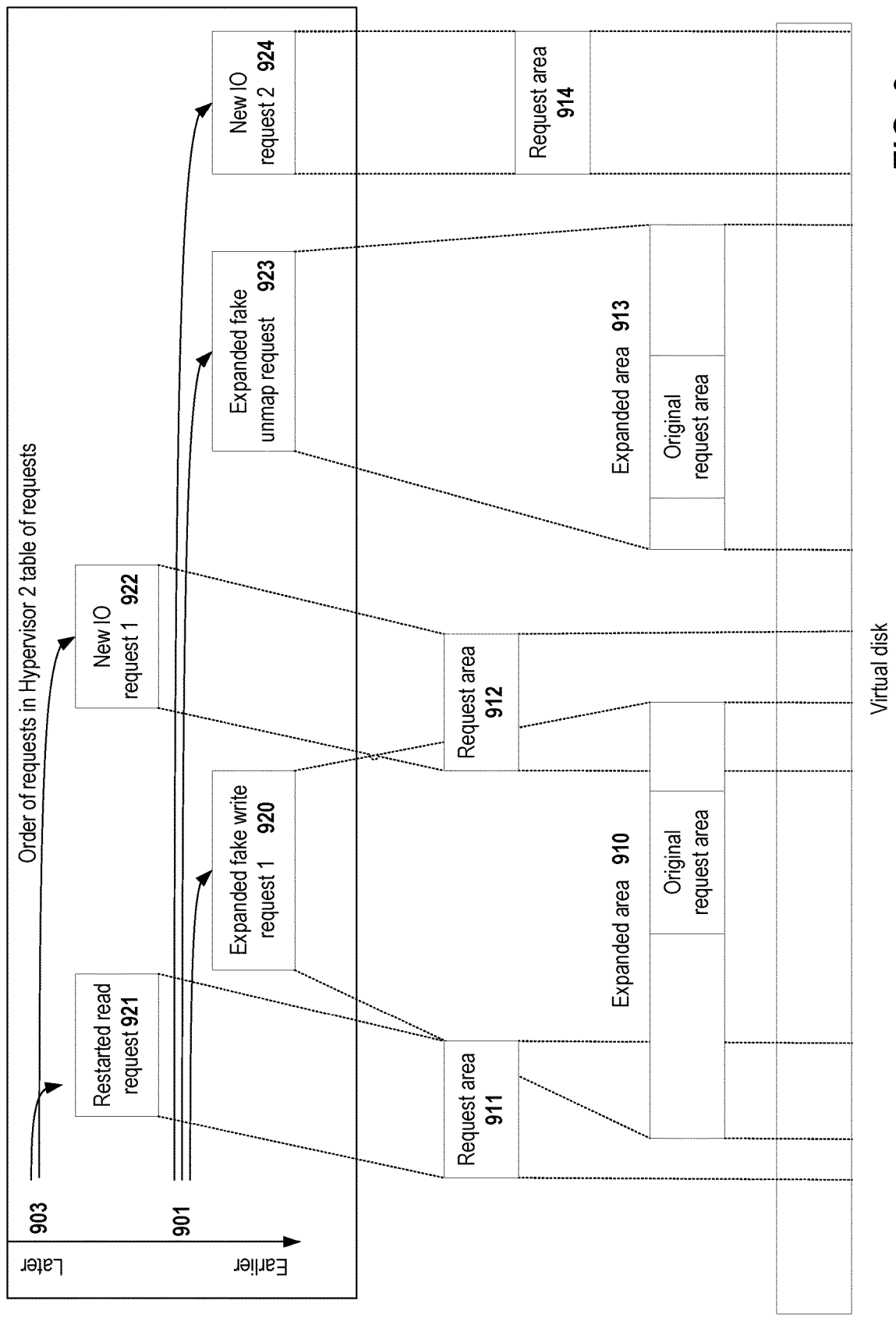
FIG. 9 illustrates an exemplary order of requests in a table of requests of the hypervisor of the target server.
Figure 10:
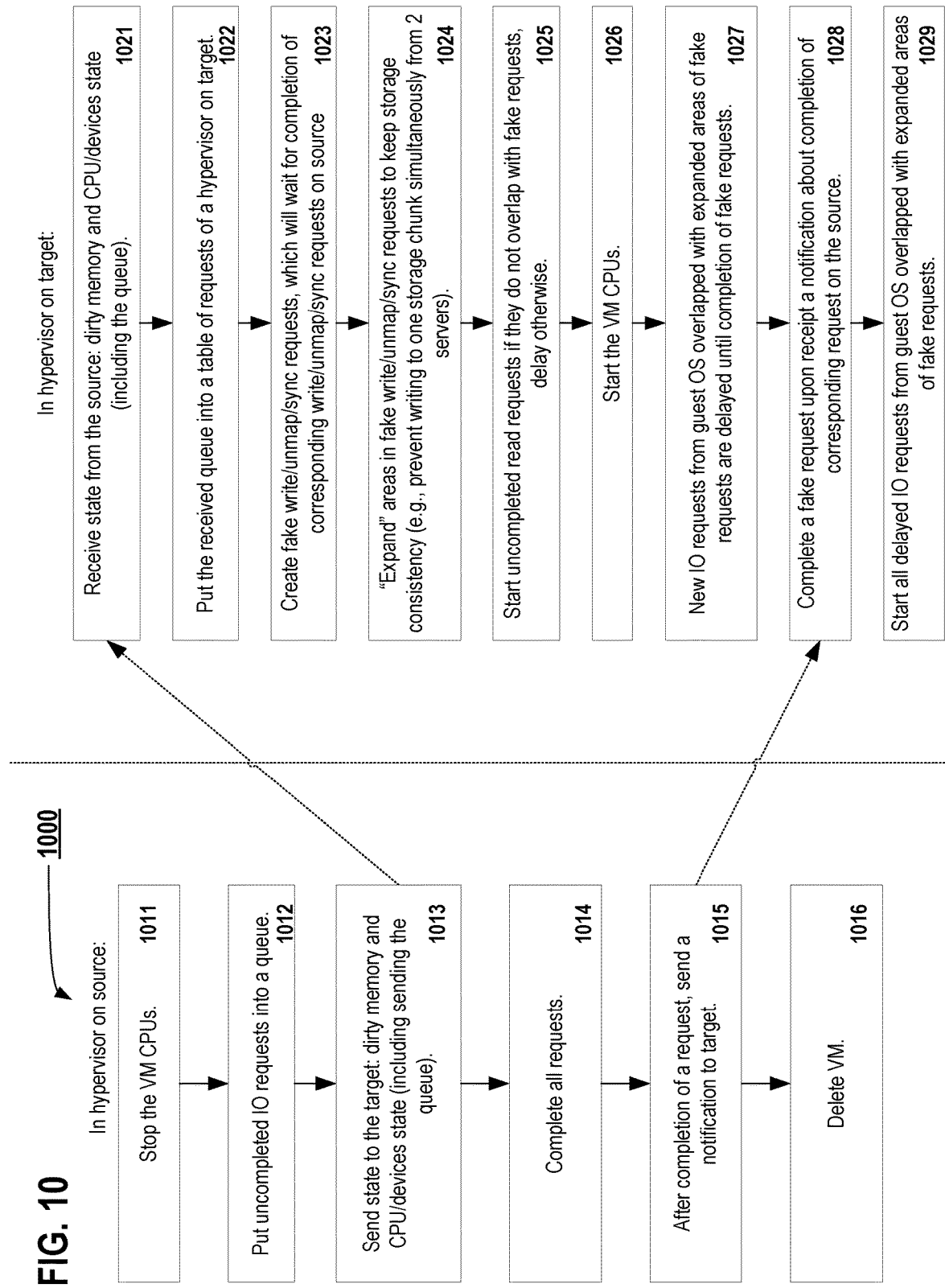
FIG. 10 illustrates an exemplary method for migration of a VM when simultaneous requests initiated by the source and the target for different areas of a chunk are not permitted in accordance to teachings of the present disclosure.

In another aspect, when the storage does not guarantee consistency of results of I/O requests for the same chunk sent to the storage by the source and the target simultaneously, the areas of the fake requests may be expanded, see FIG. 8-10.

Figure 7:
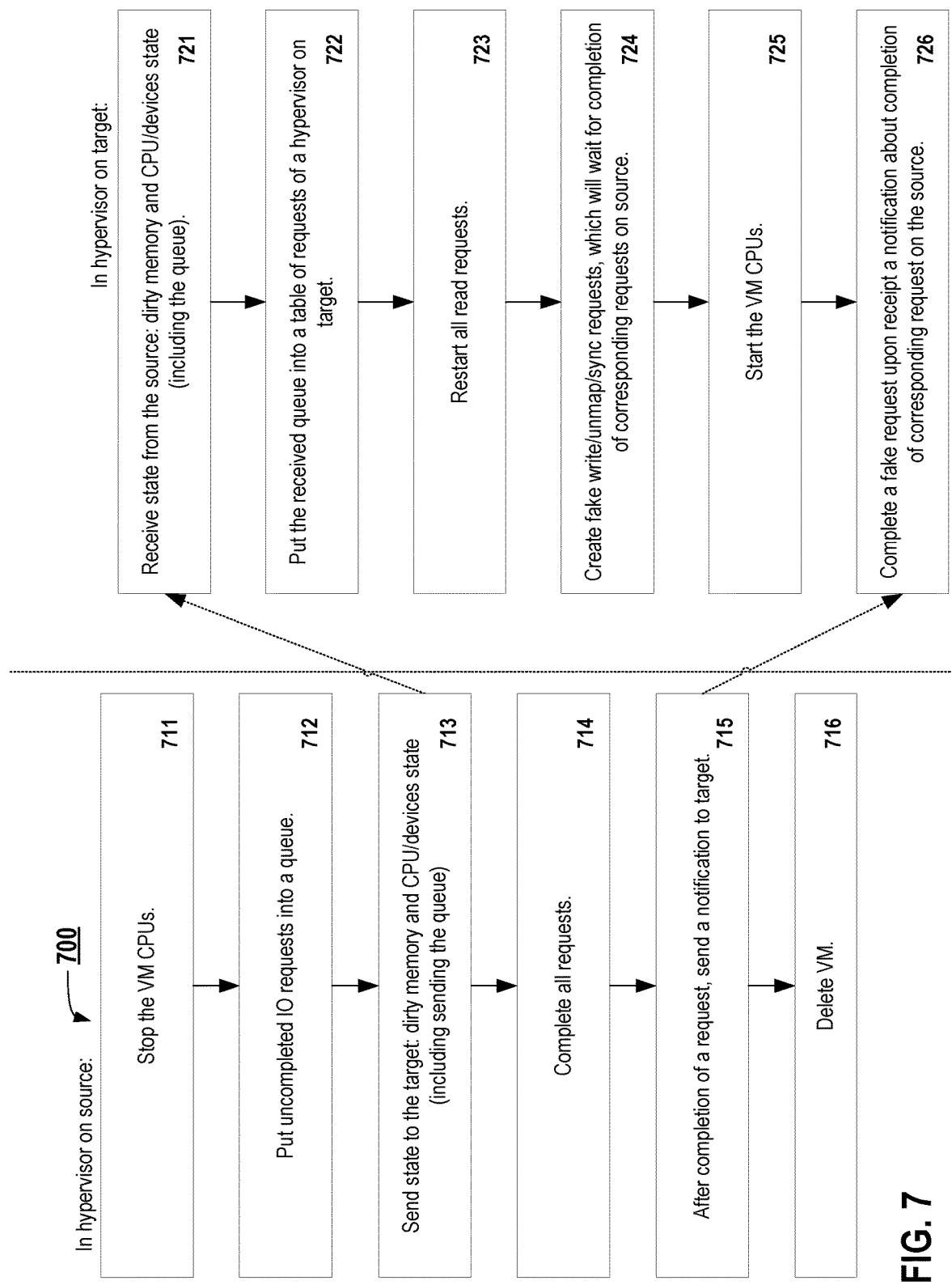
FIG. 7 illustrates an exemplary method for migration of a VM when simultaneous requests initiated by the source and the target for different areas of a chunk are permitted in accordance to teachings of the present disclosure.

FIG. 7 illustrates an exemplary method 700 for migration of a VM when simultaneous requests initiated by the source and the target for different areas of a chunk are permitted. For example, the shared storage may allow simultaneous requests issued by two different servers for different areas of one chunk. E.g., one server (e.g., the target) may perform an I/O operation (e.g., read) for an area of a chunk while another server (e.g., the source) is writing into another area of the same chunk.

In an aspect shown on the FIG. 7, the source and the target work in parallel. Both the source and the target perform I/O requests, which may occur simultaneous. The source communicates to the target. For example, the source sends to the target some information (e.g., device states, and information about uncompleted I/O requests generated by the guest OS, while it was working on the source), as shown at step 713, and notifications about completion of at least some I/O requests (e.g., those that modify disk state), as shown at step 715.

In step 711, by the hypervisor of the source server, method 700 stops CPUs of the VM.

In step 712, by the hypervisor of the source server, method 700 puts uncompleted I/O requests into a queue (in another aspects, any other way of collecting, storing, and transferring information about uncompleted I/O requests to the target may be used, like lists, messages, etc.). The uncompleted I/O requests are those that have been generated by the guest OS while the guest OS was running on the source, and that have not been completed before interruption of the guest OS execution (e.g., stopping guest OS CPUs). The uncompleted I/O requests include read requests, write requests, and un-map, sync, discard, requests etc.

In step 713, by the hypervisor of the source server, method 700 sends state of the VM to the hypervisor of the target server. In one aspect, the state includes device states, dirty memory, and the information about the uncompleted I/O requests.

In step 714, by the hypervisor of the source server, method 700 completes the uncompleted I/O requests.

In step 715, by the hypervisor of the source server, for at least one request in the queue, method 700 sends a notification to the target server after completion of the request. In one aspect, the notification includes a state or a result of the requests. In one aspect, only notifications about uncompleted I/O requests that change the disk state (e.g., write, unmap, sync, discard, etc.) are sent. In another aspect, (e.g., if the hypervisor on target creates also fake requests for read requests), the notifications about read requests are also sent to the hypervisor on target.

In step 716, by the hypervisor of the source server, after the migration is completed, method 700 deletes the VM.

In step 721, by the hypervisor of the target server, method 700 receives the state of the VM from the hypervisor of the source server including information about the uncompleted I/O requests (e.g., a queue).

In step 722, by the hypervisor of the target server, method 700 puts the received uncompleted I/O requests into a table of requests of the hypervisor of the target server. In one aspect, write/unmap requests will then be replaced in the table by fake requests.

In step 723, by the hypervisor of the target server, method 700 restarts all uncompleted read requests, which will be performed by the hypervisor of the target.

In step 724, by the hypervisor of the target server, method 700 creates: fake write requests corresponding to each uncompleted write request received from the hypervisor of the source server, fake un-map requests corresponding to each uncompleted un-map request received from the hypervisor of the source server, and so on for other types of requests that modify the virtual disk state). The created fake requests will be marked as be completed after receiving notification from the source about completion the corresponding requests on the source.

In step 725, by the hypervisor of the target server, method 700 starts the CPUs of the VM. The running guest OS may generate new I/O requests, that are processed by the hypervisor of the target.

In step 726, by the hypervisor of the target server, for each created fake request, method 700 completes the request upon receipt of a notification from the hypervisor of the source server about completion of the corresponding original request on the source server. In one aspect, the responses to the original requests processed by the source (corresponding to the fake ones) and to the read requests (completed by the hypervisor of the target) are transferred to the guest OS.

For the description of the method 700 provided above, the migration of the VM occurs from any physical (or virtual in case of nested virtualization) server to any other physical (or virtual in case of nested virtualization) server. Thus, a given server may be a source or a target server based on the direction of the migration of the VM. As such, a given hypervisor may be performing the steps needed for migrating from a given server, where the hypervisor is running, to another server with another hypervisor. In another scenario, the hypervisor may be performing the steps needed for migrating a VM from another server with another hypervisor to a server, where the hypervisor is running. In yet another scenario, the hypervisor or the source and target servers may be the same. Thus, the steps of the method 700 include steps when the hypervisor is running on the source and when the hypervisor is running on the target. However, the steps 711, 712, 713, 714, 715 and 716 are performed by the hypervisor of the source device from which the VM is being migrated. Similarly step 721, 722, 723, 724, 725 and 726 are performed by the hypervisor of the target device to which the VM is being migrated.

In one aspect, the live migration is facilitated via a live migration module. Thus, in this case, the live migration module comprises a combination of hypervisors of the target and source servers.

In one aspect, the storage does not guarantee consistency of results of I/O requests for the same chunk sent to the storage by the source and the target simultaneously. For example, the storage result of an I/O operation performed by the target on an area in a chunk, while the source is modifying another area of the same chunk may be unpredicted, even if the areas are not overlapping to each other. In the aspect, simultaneous read and write requests for different areas of one chunk performed by different servers are not permitted. Note that the storage does allow simultaneous write/read operations, performed by different servers, on different chunks and additional information about the storage, e.g., storage chunk size, is available to the servers. For this scenario, shown on FIG. 10, the order of the requests is important.

When simultaneous read and write requests for different areas of a chunk by different servers are not permitted, in one aspect, the request area of fake write requests is expanded to the size of the storage chunk. In another aspect, the request area of fake write requests is expanded and aligned to the storage chunks.

As mentioned above, modern hypervisors do not allow multiple simultaneous requests for the same area. Thus, such expanded fake write request blocks/postpones all other (e.g., read, write, and etc.) requests that are for the same storage chunk or chunks. In other words, when simultaneous read and write (and etc.) requests for different areas of a chunk initiated by different servers are not permitted, the concept of fake requests is "expanded" to cover larger storage areas. The expanded fake request blocks all requests in the table of requests of the hypervisor on the target to all chunks that store at least a part of a same area as the original write request.

For example, suppose the uncompleted I/O request is a write request. In order to block/postpone all requests to the expanded area, the hypervisor of the target server creates a fake write request, the fake write request being for a wider area—for which the storage allows simultaneous writes from different servers. Then, other requests, on the target that are associated with the same guest OS, to the areas overlapping with this wider area are postponed until the corresponding write request is completed, by the source server, on the source server. The postponed requests are executed after the fake write request (expanded) is marked as completed. Until the fake write request is marked as completed, new I/O requests generated by the guest OS at the target server to the areas overlapping with the fake request expanded area are also blocked.

FIG. 8 illustrates an exemplary request expansion. On FIG. 8 the request area of the "Expanded fake write request 1" 820 is expanded and aligned to the storage chunk size. For example, any chunks (e.g., storage chunk 851 and storage chunk 852), which contain at least a part of the original request area (e.g., area 840) of the corresponding original uncompleted I/O request on the source, are included into the corresponding expanded fake request area (e.g., area 801). The "Expanded fake write request 1" 820 blocks all requests to the expanded area 801 of the virtual disk which uses storage chunks 851 and 852.

In one aspect, all expanded fake write/unmap requests (and other fake requests corresponding to the original uncompleted I/O requests on the source, which modify data on the storage) may be created (e.g., put into the table of requests in the hypervisor on the target) before any read requests. Then, new I/O requests, generated by the running guest OS, are added to the table of requests of the hypervisor of the target server. In one aspect, the hypervisor of the source server arranges the queue (e.g., first puts all the expanded fake write requests in the queue, then puts the read requests on the queue) and then sends the queue to the hypervisor of the target server. In another aspect, the hypervisor of the target is tasked with arranging the expanded fake requests ahead of the read requests.

Each completed expanded fake request will unblock (e.g., wake up) all other (e.g., read) requests that have been blocked/postponed by the expanded request. All requests that are awakened after completion of the expanded fake request are performed in parallel with other requests in the queue (e.g., in the table of the hypervisor on the target).

In one aspect, when a corresponding request on source is completed, the corresponding expanded fake write request on target is also marked as completed, and the requests that have been blocked by it are awakened. In another aspect, the hypervisor on the target first waits for completion of all fake requests and after that performs read requests and new I/O generated by the running guest OS. That is, suppose there is a queue of all requests on the target. If, in the queue, there are 2 (read and write) requests for overlapping chunks (sets of chunks), then the read requests are postponed until the write request are completed. This is controlled/performed by the hypervisor of the target server. Therefore, the read request on the target are postponed until the write request on the source that correspond to the expanded fake write requests on the target server are completed.

FIG. 9 illustrates an exemplary order of requests in a table of requests of the hypervisor of the target server. The "expanded fake write request 1" 920 to the expanded area 910 blocks other requests (e.g., the "restarted read request" 921 and the "new I/O request 1" 922) to the areas 911 and 912 overlapping with the expanded area 910 (e.g., to chunks in the expanded area 910). The "expanded fake write request 1" 920, the "expanded fake un-map request" 923 for another storage area 913 (e.g., the area containing other chunks), and "new I/O request 2" 924 to yet another storage area 914 (e.g., the area containing yet other chunks) are processed in parallel, as shown in 901. As shown in 903, the "restarted read request" 921 and the "new I/O request 1" 922 to chucks in the expanded area 910 are postponed until completion of the "expanded fake write request 1" 920, and processed at a later time.

If an uncompleted read I/O request or a new I/O request, created by the guest OS on the target server, overlaps with one or more of the expanded fake requests, then the uncompleted read I/O request or the new I/O request is blocked/delayed until all of the one or more expanded fake requests are completed.

In one aspect, fake requests do not block each other. This is because fake requests are on the target and wait until completion of corresponding requests on the source. Only requests performed by multiple different nodes to overlapping chunks are prevented. Requests performed by the same node are consistent. More particularly, requests from the target to storage chunks to which the source is writing are delayed. However, read requests on the source are not delayed as their results are not used.

FIG. 10 illustrates an exemplary method 1000 for migration of a VM when simultaneous requests initiated by the source and the target for different areas of a chunk are not permitted. The method 1000 is performed with an expansion of the fake requests to all chunks that store at least parts of the area of the original write request.

In an aspect shown on the FIG. 10, the source and the target work in parallel. Both the source and the target perform I/O requests, which may occur simultaneous. The source communicates to the target. For example, the source sends to the target some information (e.g., device states, and information about uncompleted I/O requests generated by the guest OS, while it was working on the source), as shown at step 1013, and notifications about completion of at least some I/O requests (e.g., those that modify disk state), as shown at step 1015.

In step 1011, by the hypervisor of the source server, method 1000 stops CPUs of the VM (i.e., execution of the guest OS is interrupted).

In step 1012, by the hypervisor of the source server, method 1000 puts uncompleted I/O requests to the VM virtual disk (generated by the guest OS while it was running on the source) into a queue (or in a list). The uncompleted I/O requests include read requests, write requests, un-map, discard, sync, etc. requests.

In step 1013, by the hypervisor of the source server, method 1000 sends state of the VM to the hypervisor of the target server. In one aspect, the state includes device states, dirty memory, and the queue in which the uncompleted I/O requests are placed.

In step 1014, by the hypervisor of the source server, method 1000 completes the uncompleted requests. That is, the read, write and un-map, sinc, discard, etc. requests in the queue are processed.

In step 1015, by the hypervisor of the source server, for at least those of uncompleted I/O requests, that modify the disk state, method 1000 sends notifications to the target server after completion of the request.

In step 1016, by the hypervisor of the source server, after the migration is completed, method 1000 deletes the VM.

In step 1021, by the hypervisor of the target server, method 1000 receives the state of the VM from the hypervisor of the source server and the information about uncompleted requests (e.g., the queue).

In step 1022, by the hypervisor of the target server, method 1000 puts the received requests into a table of requests of the hypervisor of the target server. In one aspect, write/unmap requests will then be replaced in the table by fake requests.

In step 1023, by the hypervisor of the target server, method 1000 creates: fake requests corresponding to each uncompleted I/O write, un-map, discard, and other requests, which change disk state, received from the hypervisor of the source server.

In step 1024, by the hypervisor of the target server, method 1000 expands areas in fake requests to keep storage consistency. For example, the expansion prevents multiple servers from simultaneously perform I/O operations on the same storage chunk.

In step 1025, by the hypervisor of the target server, for each uncompleted read request, method 1000 determines whether the uncompleted read request overlaps with at least one expanded area of a fake request, starts the uncompleted read request when the uncompleted read request does not overlap with any expanded area of a fake request, delays the uncompleted read request when the uncompleted read request overlaps with at least one expanded area of a fake request, wherein the delay is until the fake request is completed. The fake request will be marked as being completed when notification is received from the hypervisor of the source server indicating that the corresponding original request at the source is completed.

In step 1026, by the hypervisor of the target server, method 1000 starts the CPUs of the VMs (i.e., resumes execution of the guest OS). After this, the guest OS is running and may generate new I/O requests.

In step 1027, by the hypervisor of the target server, method 1000, for each new I/O request, method 1000 determines whether the new I/O request overlaps with at least one expanded area of a fake request, starts the new I/O request when the new I/O request does not overlap with any expanded area of a fake request, delays the new I/O request when the new I/O request overlaps with at least one expanded area of a fake request, wherein the delay is until the fake request is completed.

In step 1028, by the hypervisor of the target server, for each fake request, method 1000 completes the request upon receipt of a notification from the hypervisor of the source server about completion of the corresponding request on the source server.

In step 1029, by the hypervisor of the target server, for each completed fake request, method 1000 wakes up all delayed I/O requests that overlapped with the expanded area of the fake request.

For the description of the method 1000 provided above, the migration of the VM occurs from any physical (or virtual in case of nested virtualization) server to any other physical (or virtual in case of nested virtualization) server. Thus, a given server may be a source or a target server based on the direction of the migration of the VM. As such, a given hypervisor may be performing the steps needed for migrating from a given server, where the hypervisor is running, to another server with another hypervisor. In another scenario, the hypervisor may be performing the steps needed for migrating a VM from another server with another hypervisor to a server, where the hypervisor is running. In yet another scenario, the hypervisor or the source and target servers may be the same. Thus, the steps of the method 1000 include steps when the hypervisor is running on the source and when the hypervisor is running on the target. However, the steps 1011, 1012, 1013, 1014, 1015 and 1016 are performed by the hypervisor of the source device from which the VM is being migrated. Similarly step 1021, 1022, 1023, 1024, 1025, 1026, 1027, 1028 and 1029 are performed by the hypervisor of the target device to which the VM is being migrated.

Figure 11:
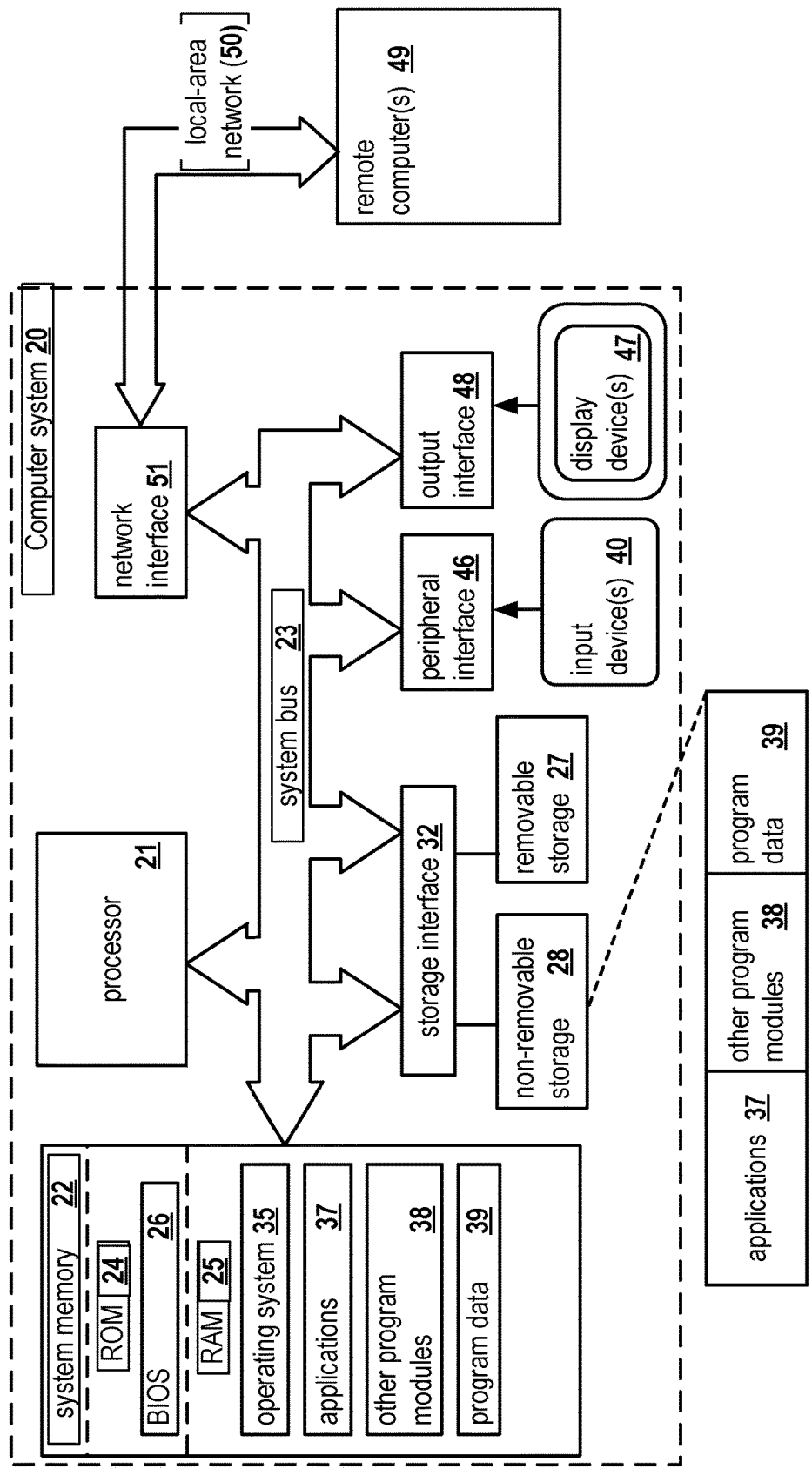
FIG. 11 is a block diagram illustrating a general-purpose computer system on which aspects of the present disclosure may be implemented in accordance with an exemplary aspect.

FIG. 11 is a block diagram illustrating a computer system 20 on which aspects of systems and methods for live migrating a VM in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 11, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for a live migration of a guest OS, the method comprising:
    interrupting execution of the guest OS in a hypervisor on a source computing device;
    transferring a state of the guest OS from the hypervisor on the source computing device to a hypervisor on a target computing device;
    resuming execution of the guest OS in the hypervisor on the target computing device without waiting for completion of pending I/O requests on the source computing device,
    wherein the pending I/O requests are the I/O requests that have been generated by the guest OS in the hypervisor on the source computing device and have not been completed before the interruption of execution of the guest OS, and
    wherein after resuming execution of the guest OS in the hypervisor on the target computing device, the guest OS in the hypervisor on the target computing device is allowed to generate new I/O requests, without waiting for completion of the pending I/O requests on the source computing device; and
    by the hypervisor on the target computing device, for each of the pending I/O requests, restarting on the target computing device the pending I/O request, when the pending I/O request is a read request, and creating a fake I/O request corresponding to the pending I/O request, when the pending I/O request is an I/O request that modifies a virtual disk of the guest OS.

2. The method of claim 1,
    wherein the pending I/O requests are I/O requests to a virtual disk of the guest OS; and
    wherein the virtual disk of the guest OS is stored on a storage accessible by both the source computing device and the target computing device.

3. The method of claim 2,
    wherein the hypervisor on the target computing device postpones at least one I/O request on the target computing device that is for access to accessing a same storage chunk as at least one of the pending I/O requests on the source computing device until completion at least one of the pending I/O requests on the source computing device.

4. The method of claim 1, wherein each of the one or more fake I/O requests waits for completion of corresponding pending I/O request on the source computing device.

5. The method of claim 4, further comprising:
    for each of the pending I/O requests, sending, by the source computing device, a notification about completion of the pending I/O request on the source computing device; and
    completing, by the hypervisor on the target computing device, a fake I/O request corresponding to the pending I/O request upon receiving the notification, and
    wherein the state of the guest OS transferred from the hypervisor on the source computing device to the hypervisor on the target computing device includes information about at least one of the pending I/O requests.

6. The method of claim 1,
    wherein the fake I/O requests are expanded fake I/O requests; and
    wherein areas of the expanded fake I/O requests are expanded and aligned on a size of storage chunks.

7. The method of claim 1,
    wherein, the hypervisor on the target computing device postpones at least one of the new I/O requests on the target computing device that is for an area overlapping with an area of at least of the fake I/O requests corresponding to at least one of the pending I/O requests until completion of the at least one of the pending I/O requests on the source computing device.

8. The method of claim 6,
    wherein the hypervisor on the target computing device postpones at least one I/O request on the target computing device that is for an area overlapping with an area of at least one of the expanded fake I/O requests until completion of at least one of the pending I/O requests corresponding to the at least one of the expanded fake I/O requests.

9. A system for a live migration of a guest OS, the system comprising:
    any number of computing devices having respective processors and memory,
    a live migration module configured to:
        interrupt execution of the guest OS in a hypervisor on a source computing device;
        transfer a state of the guest OS from the hypervisor on the source computing device to a hypervisor on a target computing device;
        resume execution of the guest OS in the hypervisor on the target computing device without waiting for completion of pending I/O requests on the source computing device,
        wherein the pending I/O requests are the I/O requests that have been generated by the guest OS in the hypervisor on the source computing device and have not been completed before the interruption of execution of the guest OS, and
        wherein after resuming execution of the guest OS in the hypervisor on the target computing device, the guest OS in the hypervisor on the target computing device is allowed to generate new I/O requests, without waiting for completion of the pending I/O requests on the source computing device; and
        by the hypervisor on the target computing device, for each of the pending I/O requests, restart on the target computing device the pending I/O request, when the pending I/O request is a read request, and create a fake I/O request corresponding to the pending I/O request, when the pending I/O request is an I/O request that modifies a virtual disk of the guest OS.

10. The system of claim 9,
    wherein the pending I/O requests are I/O requests to a virtual disk of the guest OS; and
    wherein the virtual disk of the guest OS is stored on a storage accessible by both the source computing device and the target computing device.

11. The system of claim 10,
    wherein the hypervisor on the target computing device postpones at least one I/O request on the target computing device that is for accessing a same storage chunk as at least one of the pending I/O requests on the source computing device until completion at least one of the pending I/O requests on the source computing device.

12. The system of claim 9, wherein each of the one or more fake I/O requests waits for completion of corresponding pending I/O request on the source computing device.

13. The system of claim 12, the live migration module further configured to:
for each of the pending I/O requests, send, by the source computing device, a notification about completion of the pending I/O request on the source computing device; and
complete, by the hypervisor on the target computing device, a fake I/O request corresponding to the pending I/O request upon receiving the notification, and
wherein the state of the guest OS transferred from the hypervisor on the source computing device to the hypervisor on the target computing device includes information about at least one of the pending I/O requests.

14. The system of claim 9,
wherein the fake I/O requests are expanded fake I/O requests; and
wherein areas of the expanded fake I/O requests are expanded and aligned on a size of storage chunks.

15. The system of claim 14,
wherein the hypervisor on the target computing device postpones at least one I/O request on the target computing device that is for an area overlapping with an area of at least one of the expanded fake I/O requests until completion of at least one of the pending I/O requests corresponding to the at least one of the expanded fake I/O requests.

16. The system of claim 9,
wherein, the hypervisor on the target computing device postpones at least one of the new I/O requests on the target computing device that is for an area overlapping with an area of at least of the fake I/O requests corresponding to at least one of the pending I/O requests until completion of the at least one of the pending I/O requests on the source computing device.

17. A non-transitory computer readable medium storing thereon computer executable instructions for a live migration of a guest OS, including instructions for:
interrupting execution of the guest OS in a hypervisor on a source computing device;
transferring a state of the guest OS from the hypervisor on the source computing device to a hypervisor on a target computing device;
resuming execution of the guest OS in the hypervisor on the target computing device without waiting for completion of pending I/O requests on the source computing device,
wherein the pending I/O requests are the I/O requests that have been generated by the guest OS in the hypervisor on the source computing device and have not been completed before the interruption of execution of the guest OS, and
wherein after resuming execution of the guest OS in the hypervisor on the target computing device, the guest OS in the hypervisor on the target computing device is allowed to generate new I/O requests, without waiting for completion of the pending I/O requests on the source computing device; and
by the hypervisor on the target computing device, for each of the pending I/O requests, restarting on the target computing device the pending I/O request, when the pending I/O request is a read request, and creating a fake I/O request corresponding to the pending I/O request, when the pending I/O request is an I/O request that modifies a virtual disk of the guest OS.

18. The non-transitory computer readable medium of claim 17,
wherein,
each of the fake I/O requests waits for completion of a corresponding pending I/O request on the source computing device,
the pending I/O requests are I/O requests to a virtual disk of the guest OS,
the virtual disk of the guest OS is stored on a storage accessible by both the source computing device and the target computing device,
the state of the guest OS includes information about at least one of the pending I/O requests, and
the hypervisor on the target computing device postpones at least one I/O request on the target computing device that is for access to accessing a same storage chunk as at least one of the pending I/O requests on the source computing device until completion at least one of the pending I/O requests on the source computing device.

19. The non-transitory computer readable medium of claim 18, the instructions further comprising instructions for:
for each of the pending I/O requests, sending, by the source computing device, a notification about completion of the pending I/O request on the source computing device; and
completing, by the hypervisor on the target computing device, a fake I/O request corresponding to the pending I/O request upon receiving the notification, and
wherein the state of the guest OS transferred from the hypervisor on the source computing device to the hypervisor on the target computing device includes information about at least one of the pending I/O requests.

20. The non-transitory computer readable medium of claim 18,
wherein the fake I/O requests are expanded fake I/O requests; and
wherein areas of the expanded fake I/O requests are expanded and aligned on a size of storage chunks.

21. The non-transitory computer readable medium of claim 20,
wherein the hypervisor on the target computing device postpones at least one I/O request on the target computing device that is for an area overlapping with an area of at least one of the expanded fake I/O requests until completion of at least one of the pending I/O requests corresponding to the at least one of the expanded fake I/O requests.

22. The non-transitory computer readable medium of claim 18,
wherein, the hypervisor on the target computing device postpones at least one of the new I/O requests on the target computing device that is for an area overlapping with an area of at least of the fake I/O requests corresponding to at least one of the pending I/O requests until completion of the at least one of the pending I/O requests on the source computing device.

* * * * *